United States Patent
Mertens (10) Patent No.: US 9,511,290 B2
(45) Date of Patent: Dec. 6, 2016

(54) GAMING SYSTEM WITH MOVEABLE DISPLAY

(75) Inventor: Mark Jozef Willem Mertens, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1561 days.

(21) Appl. No.: 12/299,823

(22) PCT Filed: May 3, 2007

(86) PCT No.: PCT/IB2007/051648
§ 371 (c)(1),
(2), (4) Date: Nov. 6, 2008

(87) PCT Pub. No.: WO2007/132386
PCT Pub. Date: Nov. 22, 2007

(65) Prior Publication Data
US 2009/0176544 A1    Jul. 9, 2009

(30) Foreign Application Priority Data
May 9, 2006   (EP) ..................................... 06113685

(51) Int. Cl.
*A63F 13/00* (2014.01)
*A63F 13/52* (2014.01)
(Continued)

(52) U.S. Cl.
CPC ............... *A63F 13/52* (2014.09); *A63F 13/02* (2013.01); *A63F 13/10* (2013.01); *A63F 13/213* (2014.09); *A63F 2300/1006* (2013.01);
(Continued)

(58) Field of Classification Search
CPC .................. A63F 2300/1006; A63F 2300/204

USPC ...................................... 463/30, 37; 446/321
See application file for complete search history.

(56) References Cited

U.S. PATENT DOCUMENTS

| 5,779,576 A | 7/1998 | Smith, III et al. |
| 2002/0082079 A1* | 6/2002 | Mantyjarvi et al. ............ 463/30 |

(Continued)

FOREIGN PATENT DOCUMENTS

| EP | 1216730 A2 | 6/2002 |
| EP | 1232772 A2 | 8/2002 |

(Continued)

OTHER PUBLICATIONS

"Philips' Photonic Pillow" posted by Rory Reid Jul. 19, 2005 [http://labs.pcw.co.uk/2005/07/Philips-photoni.html].*

(Continued)

*Primary Examiner* — James S McClellan
*Assistant Examiner* — Syvila Weatherford (57) ABSTRACT

If one has at his disposition a robust display which can be thrown around, a whole new range of computer games can be designed. The electronic gaming system comprises: a robust, moveable display (101); a game controller (103), arranged to generate a game scenario, comprising generation of pictures to be displayed on the robust moveable display (101); and a trajectory mapping unit (105), arranged to map a virtual trajectory in space-time of a virtual world in the game scenario, with at least two of the pictures with unequal picture content corresponding to different locations of the virtual space-time trajectory, to a real trajectory of the robust moveable display (101) in real space, so that at an appropriate moment the two of the pictures are displayed on the robust moveable display (101).

18 Claims, 3 Drawing Sheets

(51) Int. Cl.
*A63F 13/213* (2014.01)
*A63F 13/98* (2014.01)
*A63F 13/40* (2014.01)

(52) U.S. Cl.
CPC . *A63F 2300/1087* (2013.01); *A63F 2300/204* (2013.01); *A63F 2300/301* (2013.01)

(56) References Cited

U.S. PATENT DOCUMENTS

| | | | |
|---|---|---|---|
| 2004/0029640 A1* | 2/2004 | Masuyama et al. | 463/43 |
| 2005/0270280 A1 | 12/2005 | Riback et al. | |
| 2005/0285547 A1 | 12/2005 | Piepgras et al. | |
| 2006/0172787 A1* | 8/2006 | Ellis et al. | 463/1 |
| 2006/0223635 A1* | 10/2006 | Rosenberg | 463/37 |
| 2006/0258451 A1* | 11/2006 | Yang | 463/36 |
| 2008/0094417 A1* | 4/2008 | Cohen | 345/632 |

FOREIGN PATENT DOCUMENTS

| | | | |
|---|---|---|---|
| EP | 1645313 A2 | 4/2006 | |
| JP | 2000225273 A | 8/2000 | |
| JP | 2005168521 A | 6/2005 | |
| WO | 0183067 A2 | 11/2001 | |
| WO | WO 2004009193 A1 * | 1/2004 | A63F 3/02 |
| WO | 2004095056 A1 | 11/2004 | |
| WO | 2004107028 A1 | 12/2004 | |

OTHER PUBLICATIONS

Rory Ried:" Philips' Photonic Pillow", [Online] The IT Heavyweight, Personal Computer World, Jul. 19 2005, XP002455737.
"A Toy? A Game? A Gadget? The Addictive i-Top"; Thinkgeek, Inc. Advertisement for the i-Top LED game, 2005, 2 page document, downloaded from http://www.thinkgeek.com/geektoys/games/6bld/ on Jan. 12, 2005.
Inami et al: "Optical Camouflage"; Article on Mechanisms of Optical Camouflage; Downloaded From http://projects.star.t.u-tokyo.ac.jp:/projects/MEDIA/xv/oc.html, on Jan. 12, 2005, 3 Page Document.
Wright: "Making Sense of Sensors": Communications of the ACM, vol. 52, No. 2, pp. 14-15, Feb. 2009.
Sonic Golf Training Tool: "Feedback Devices for Teaching and Training Golf": Downloaded at http://pww.research.philips.com/ natlab/hvetech/smart-sonic-golf.htm, on Jan. 12, 2005, 2 Page Document.
Skywriter—1 Page Document on Scanned LED Displays; Downloaded at http://pww.research.philips.com/natlab/hvetech/display-scanned LED.htm, Jan. 12, 2005.
Wright: "Making Sense of Sensors"; Communications of the ACM, vol. 52, No. 2, pp. 14-15, Feb. 2009.

* cited by examiner

GAMING SYSTEM WITH MOVEABLE DISPLAY

The invention relates to a robust display enabling coordinated dynamic interaction in an environment in contrast to existing static (merely responsive) displays, allowing games to be played with it, and a gaming system which allows the tracking of the dynamic motion of the display through and environment such as a living room, and coordinating this with a game scenario, involving the display of events. The invention also relates to gaming methods of using such a display, and a protocol signal for transmitting data required for the interaction between the used display and the game system, and software enabling this.

Displays are intended to be able to statically show incoming pictures, and it is believed that in the future a couple of display formats will dominate (although with variations), leaving aside in this text the many indicating displays like on a washing machine.

For the electronic paper-type applications, a foldable and detachable (so that one can put a page part on a table, give it to a friend, stick it to a wall, . . . ) multi-leaved booklet of about the current pocket-fitting book size (a little like current plastic baby books) may become one of the most popular formats.

Also, a display of wrist-strapable size will become interesting for displaying small amounts of data, such as short notes and reminders, information from nearby shops, or feedback of health information.

Finally, beamers could be interesting for projection of general shape and size images. E.g. one could attach to the ceiling a base plate of Velcro, to which one could attach in a desirable configuration a number of downwards unreelable projection screen slices. So one could form a panorama around one's exercise bike, or in an office a variable screen in between the furniture, so that both the speaker and visiting guests could optimally see a presentation. The projector can then adjust the video data, e.g. if there are more panes to the side, it can take an object out of the video data and excessively shift it towards one of these side panes.

At the moment the majority of the prior art displays is according to one of the formats which could be described as a "picture-frame-type" (rather static, 4:3 or 16:9) [or sometimes even "big box", which made the CRT unpopular] display, such as an LCD, PDP (plasma panel display), projection TV, and the like.

Also, in small amounts, for special applications, special displays can be designed, such as for commercial advertisement, or for gluing onto a drinking glass. Technologies for achieving this may e.g. be flexible displays comprising LCD material (WO2004107028) or OLED.

The gaming industry is a quickly growing industry, with people spending leisure time increasingly on games, an increasing amount of this time being spent on computer games (requiring currently a think-over and fight-back from the classical game industry, producing such games like monopoly), and games are also moving to the portable domain, such as for mobile phones.

The disadvantage of gaming when the game software must interact with the user by means of display on such "picture-frame-type" displays, is that users may become unhealthy couch-potatoes. E.g., the game of "doom" is (supposed to be and hence described as) an action game, with a character running around and shooting monsters. But actually all the action the user gets is straining his fingers on the keyboard. Also, he has to stare for hours in a fixed position towards the screen.

It is an object of the invention to provide a more versatile gaming technology, not along the lines of the present systems.

This object is realized by an electronic gaming system comprising:
  a robust, moveable display (101);
  a game controller (103), arranged to generate a game scenario, comprising generation of pictures to be displayed on the robust moveable display (101); and
  a trajectory mapping unit (105), arranged to map a virtual trajectory in space-time of a virtual world in the game scenario, with at least two of the pictures with unequal picture content corresponding to different locations of the virtual space-time trajectory, to a real trajectory of the robust moveable display (101) in real space, so that at an appropriate moment the two of the pictures are displayed on the robust moveable display (101).

Having an easily moveable, robust display, allows the players to really physically play with it, and hence also exercise their muscles together with their brains. The present invention description describes what kind of system technology is then required for gaming with such a display, and which types of novel games can be played (merely from a technical perspective, the exact gaming scenarios are of course for game developers to create).

Presently available displays are not really suited for the purpose. Not only are they typically heavy, pointy, and difficult to handle, but most displays do not handle dropping even once very well (e.g. dropping a CRT from not so high may introduce a shift in the shadow mask, effectively destroying the display). With moveable is intended easily moveable, which will typically in many games involve throwing, whereby the display follows a parabolic path through space. With robust is meant that the display is manufactured so that it can endure without fault (or at least over 99% of the displays) a large number of typical gaming actions (dependent on the game or games which can be played with the packet sold: if the gamers have sticks supplied with the game, both the sticks—which will typically be somewhat soft in case children start beating each other—and the display will be so manufactured that they can survive the interactions). E.g. a ball as in FIG. 2 will be thrown many times during game playing, hence the manufacturer will test it so that it should e.g. be able to fall onto the ground from a height of 3 meters for a predetermined N=10 000 times without being damaged, i.e. impairment any of its incorporated functions. A display may also be realized more robust than required for typical game actions, since especially children may use their toys for anything.

This implies for the technology a number of technical adjustments. Typically the display will have a relatively durable outer shell, which can take the impacts of collisions, and buffers the deformation so that the internal parts are protected. It should also not wear or tear significantly, etc., so that it retains its fresh appearance. The internal parts need to be securely fixed to the shell (e.g. by gluing, or otherwise fastening), so that they do not come loose. Therefore, they will typically as far as possible be incorporated in the interior of the display, but exterior components—such as e.g. a light sensor or camera for sensing the environment—will typically be embedded a little in the shell, i.e. the shell comprises a shallow pit, in which the component is shielded from most interactions with the environment, since the display bumps into surrounding objects with the slightly higher surroundings of the pit.

Thirdly, the picture display unit itself needs to be robust also, i.e. a display unit for very shocky environments need to be selected, i.e. they can be specifically made more robust by i.a. incorporating them in a transparent protection layer, making sure all soldering is extra secure, etc.

Furthermore, it may be desirable that the display is elastic, so that it bounces away again in collisions, or the display may be soft (such as the cushion of FIG. 3), so that there is less danger if it collides with players or furniture.

Figure 1:
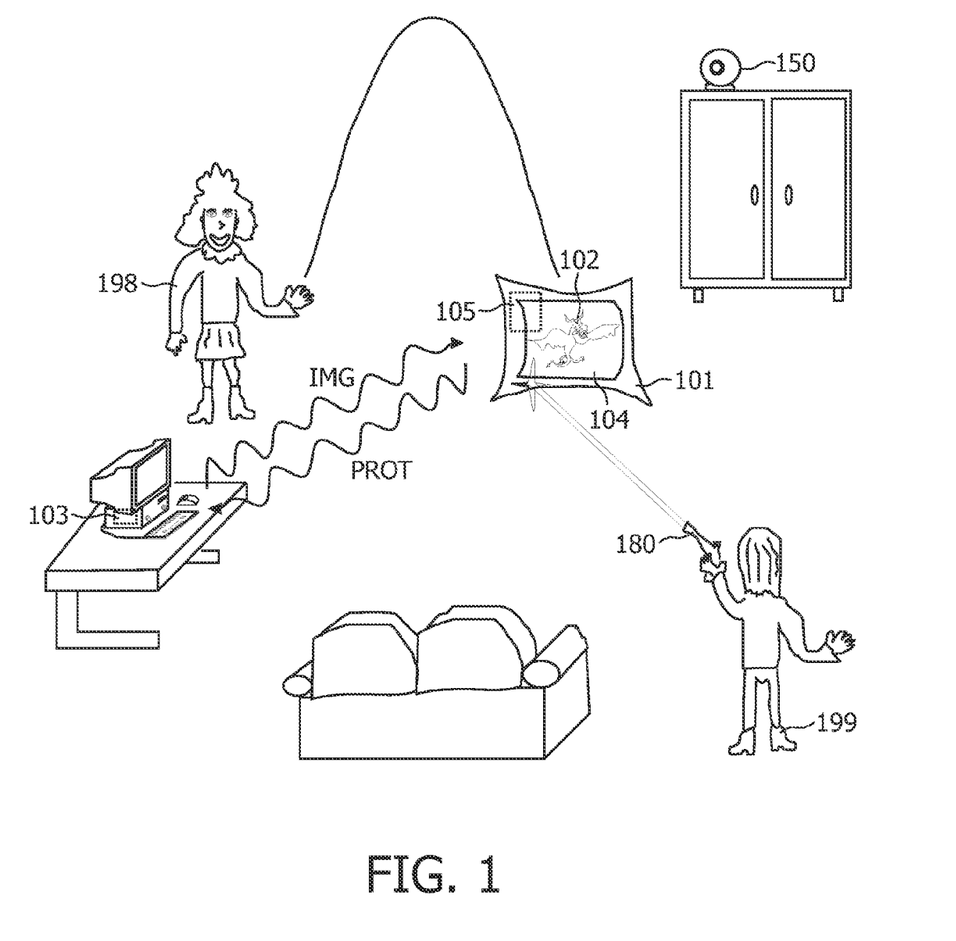
FIG. 1 schematically illustrates an embodiment of the gaming system set up in a living room.

Having such a moveable display means that it can participate in a game as a kind of extra actor/character, in addition to the human players. A game controller (which may e.g. reside in a home computer and be the rules of a bought game software program running on the computer's processor) generates the different actions to happen for each time moment of a playing game scenario. E.g. the character must display some behavior. In FIG. 1 the character is a dragon, which because of what happened previously in the game is angry. This will be shown with "angry dragon" pictures on the moveable display selected from a memory storing all dragon pictures (or generated real-time from computer graphics rules). When the trajectory mapping unit 105 realizes that the girl 198 has thrown the dragon into the air, it will coordinate the showing on the display of consecutive pictures showing the dragon flapping its wings for consecutive positions on its parabolic trajectory. When it comes near to the boy 199, the display will show pictures of the dragon character breathing fire (a further actuator producing smoke could in this particular game also be incorporated into the display for enhanced effect, if cost and security considerations favor this), indicating that the boy has to perform some action (shoot it, hit it with a bat) or loose points. Of course typically a loudspeaker will be included, so that what is realizable for video will also be realizable for audio (the dragon will roar when approaching the boy).

Hence, the trajectory mapping unit keeps track of the motion of the moveable display in real space-time, typically by analyzing information from all kinds of sensors, such as e.g. a clock, an accelerometer, a camera, etc. A simple accelerometer can already give a rough indication of vertical motion: it will sense the start of the motion being the throw, sense the deceleration near the maximal height, and roughly predict when it will hit the floor by means of a clock and the up going path measurements. Trajectory representations (both of the virtual and real trajectory; and more complicated trajectories can be simplified to match with the simpler one of the real and virtual one) can be very simple, such as e.g. ["ascending path", "high flight", "descending path] or ["free flight", "nearing player"]. More advanced trajectory mapping units (which e.g. keep detailed centimeter accurate parametric representations of the different paths followed over e.g. the previous hour) will be coupled to sensors which measure more accurate position information (and hence possibly the relative position to players) of the display, such as camera(s), or an ultrasound measurement system (based on time-of-flight analysis or spectral analysis such as in WO 2004/095056).

Finally, typical game software for this system will incorporate behavior rules depending on the motion of the display, and to make a more interesting game, also depending on the motion and actions of the players. Thereto players may wear co-supplied tracking devices, or at least one camera 105 may analyze their moves.

Since the display is now typically moving through a player's room, the software may be arranged to before playing input the room configuration, which the trajectory mapping unit can take into account when determining which precise path through the room is followed, feed backing this via the protocol signal PROT to the game controller, which may then transmit the appropriate pictures in forward signal IMG (which may comprise further information such as rules of a short part of the game scenario, describing e.g. how the displayed character on the moveable display should behave, i.a. depending on interaction with the user, the further information depending on the amount of gaming capability realized inside the moveable game display) depending on where in the room the display flies.

E.g. in a particular game two groups of people may throw the display towards each other across a row of blocking players, who should not get hold of the display. But to make the game more interesting, there are regions of the room where the display should not pass through or fall on the ground. E.g. the east-side corner of the room may be pre-marked as a "no-go" zones, costing points (or making the dragon more angry). One can also specify objects that should not be collided with (e.g. the display should not touch the couch in any way).

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. electromagnetic fields.

FIG. 1 shows the gaming system when playing in a room (of course some games could also be played outside, in particular if the robust moveable display 101 is a stand-alone computing device, also comprising the game controller 103, and means to download—wired or wireless—a particular game into comprised memory). The girl 198 throws the display, which shows a dragon character 102 (an exemplary embodiment of such a cushion display is described below with FIG. 3). Along the up going path, the dragon ignores the presence of the players, and flies on unaware, however along the fall the dragon turns his head angrily towards the boy (with a more expensive display, with a picture display unit 104 on either side of the cushion, the girl need not throw the cushion the right way; since for a simple display of icons, 32×32 LEDs will suffice for many games, typically the displays will be so configured that they can display on either side, e.g. the same picture, or display at least a correct, facing side of a character on a picture display unit 104 mostly directed towards the players towards whom the display is moving; for a ball six orthogonal picture display units 104 will be a good choice), which is already convincing with a mere rendering of a head turn, particularly at flying speed. The boy 199 has to shoot the dragon with a toy gun 180 (e.g. infrared, or if already an ultrasound position estimating means is incorporated in the display, it may be re-used for the shooting, in which case the gun will typically emit a special recognizable signal, e.g. a particular temporal sequence of pulses), anywhere, or perhaps on a particular one of a network of sensors on the display, such as the sensor right between the eyes.

A trajectory mapping unit 105 (which is advantageously situated inside the moveable display, but in case of e.g. camera-based real trajectory analysis may also reside e.g. in the PC) monitors the trajectory through space-time of the ball (e.g. in a simple scenario: is it still flying or has it dropped to the floor; possibly supplemented with what additionally happened to the display, e.g. if it was shot at, conceptually the real trajectory of a flying dragon character may change into a falling dead dragon, even if it is physically still moving upward; this will typically be marked and e.g. feed backed to the game controller via the protocol signal as falling trajectory sub segment, and e.g. a less detailed measurement of the path need be done if only a static dead dragon is shown on the remainder of the path), in particular typically its current position and the history of previous positions (e.g. it was thrown to the left, then lay on the floor for ten seconds, and now was thrown again and is still falling).

The part of the behavior rules of the dragon character which is most relevant for this invention is the way it moves, i.e. which images should be display depending on its position in virtual/real space-time, and dependent on such further internal character status parameters, such as e.g. how many times it was shot at before already. The display/character game data will be e.g. information on the motion along the trajectory, or that it has taken a shot, or how tired it becomes, more frightened when moving towards a certain part of the room, etc., which can also help in the further selection of received pictures or the request of particular pictures to the game controller.

The trajectory mapping unit 105 may be coupled wirelessly (typical radio frequency wireless communication technologies are integratable by the skilled person) to a well-placed camera 150 (e.g. a typical PC camera), e.g. on top of a high cupboard in the corner of the room, or a 360-surround lens camera placed on a centrally placed table. From such a good vantage point the camera can best see most actions, although even better for occlusion reasons is several strategically placed cameras.

Image processing software typically uses motion analysis (e.g. refined block-based motion estimation, by matching the block vectors with underlying object color statistics) as a first stage to segment the moving objects (players and moving display) from the static background. Shape analysis can then be used to identify the moving objects. At present, person analysis techniques are sufficiently developed for the purposes of playing games with the present system. Person objects can be detected, preferably even with face detection the exact player can be identified (and tracked when moving through space also when his face is not so well visible, e.g. Kalman-type filters can be designed for this). Also their actions can be analyzed, by first identifying their cylinder-shaped extremities, and then using artificial intelligence motion rules to classify which likely action occurred (e.g. an arm reaching, slapping if the motion is differently oriented and faster, boxing, etc.). The display can typically be identified by matching its extracted shape with stored information, typically discounting from the match the part where the varying pictures are shown. E.g. a circular object will be the ball. Coloring the display shell, e.g. the ball is still translucent, but slightly purplish, or having the picture display units at regular times display a particular flashing pattern may aid the recognition.

The game controller 103 (which ideally resides in the user's generic PC, so that easily new games can be downloaded, but for simple games may also reside in the moveable display) will typically do most of the game processing, e.g. keeping the score, behavior status of characters (although there may be memory for keeping the behavior-related status information of the characters in the separate supplied moveable displays 101 themselves), etc. The game controller 103 will typically be the master of which pictures should be transmitted, dependent on the current state of the game scenario, and the information of the motion of the display 101 received from the trajectory mapping unit 105, via the protocol signal PROT if it resides in the display.

This protocol signal may be embodied e.g. as a list of object positions (e.g. x, y, z) for the moveable display (preferably also supplemented with one up to 3 orientation angle values), comprising typically also the times at which they occur (or are estimated to occur with the laws of gravitational motion and preferably configuration information of the room). A very simple protocol signal contains only e.g. a time already in flight and an estimated time to land (simplifying the trajectory greatly into just an interval of free motion). At least the current position should preferably be transmitted, in which case the game controller can use the stored previous position for inferring what is happening to the device, or at least a mere indication that the display is still moving (from the accelerometer, or camera, or ultrasound system, . . . ). Typically the protocol will also contain classes for specifying information about which type of interactions occurred, e.g. that the display was touched or picked up, and when desired for the game, further specifying information like on which side it was picked up, how fast/rough, by whom, etc. The actions of players will often by detected and transmitted directly to the game controller (e.g. information from the camera, the images itself or already pre-processed information being transmitted), but this may also go via the trajectory mapping unit 105, in which case the protocol will also contain classes for conveying this information (i.e. player positions, absolute in the room, or relative positions or distances of players to the display, which can be as simple as an indicator "player nearby"; player behavior such as movements, speech, . . . , typically classified into a number of classes required for the particular game [e.g. the player is "angry" at the display, "kills" the displayed character, etc.; typically the protocol signal standard will contain a number of agreed classes for all currently supported games).

In the case virtual trajectory information, and possibly already the required pictures are pre-transmitted to the moveable display, the trajectory mapping unit 105 may take care of the identification/coordination (with a predetermined mapping between the virtual and real trajectory, e.g. the virtual trajectory may be a standard size parabola, or even a line segment, the points of which are mapped to the real parabola points), and no protocol signal feedback is in principle required. In an intermediate version, the trajectory mapping unit 105 may identify subsegments of the real (and virtual) trajectory and identify only order codes for the subsegments, in which case the game controller may transmit the appropriate pictures for the particular sub segment, should there be many pictures, also dependent on scenario information that may not be known to the display (e.g. the extremum of the parabola may have allocated order code=5). The trajectory mapping unit 105 will further typically comprise (apart from the software calculating a representation of the real trajectory and matching it with the virtual trajectory) memory for storing such a representation, and control algorithms, which can closely cooperate with a receiver and the picture display units 104 in the moveable display (i.e. typically some of the received pictures can be temporally stored in memory and transferred to the picture display units 104 at the right moment; there typically be a coupling to a clock 206 in the moveable display).

Typically before playing a game, the moveable display will announce its capabilities to the game controller via the protocol signal PROT. E.g. if its trajectory mapping unit has no access to sensors allowing precise trajectory identification, this is conveyed so that the game controller changes the scenario (or at least the forward signals IMG derived from the scenario) into a simpler one, which e.g. instead of a complex dragon rendering, changes this in a command to alternate two pictures ("wings up" "wings down") for a certain amount of time, which corresponds to a likely fly time.

Figure 2:
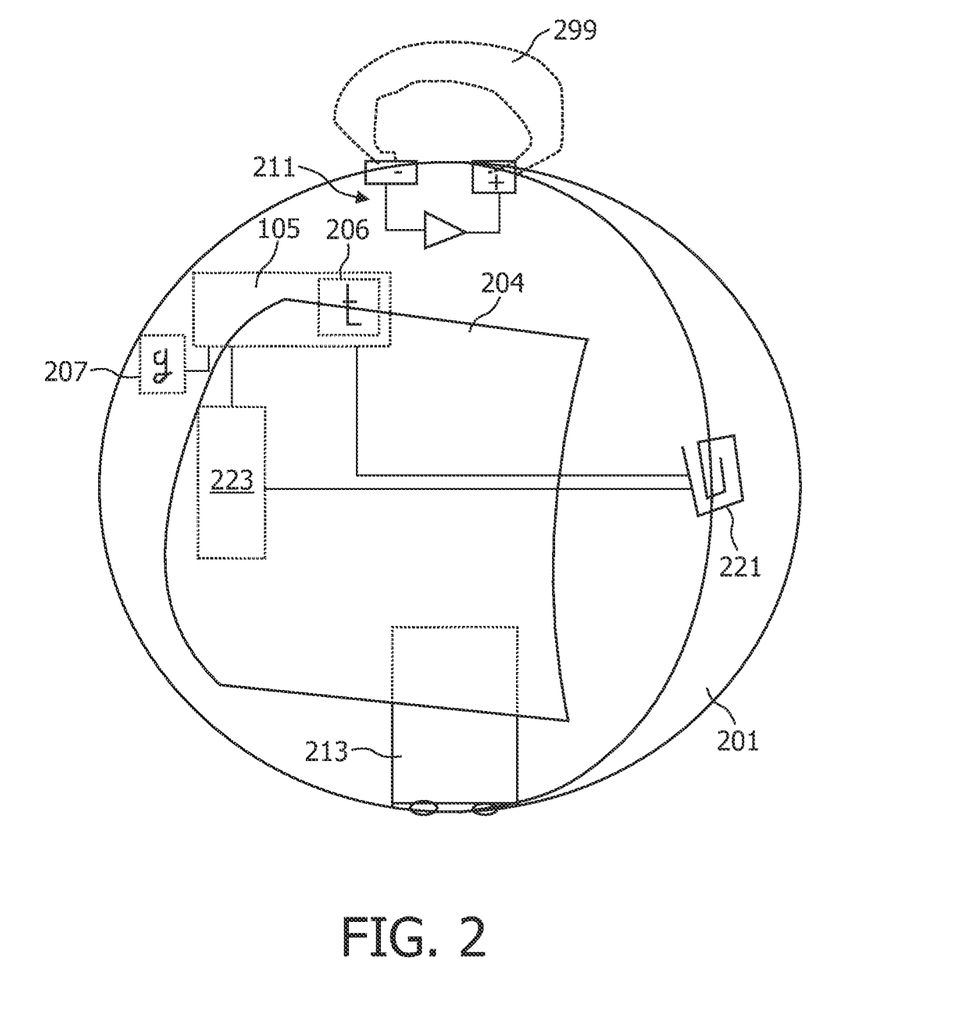
FIG. 2 schematically illustrates a ball-shaped robust moveable display specifically designed for playing at least one particular interactive game with the gaming system.

FIG. 2 shows an exemplary embodiment 201 of a relatively simple robust moveable display, which can be used in the present systems for some games. A typical game playable with this display is the following. Player 198 throws the ball roughly in the direction of player 199. The ball shows a friendly picture, such as a piece of fruit, and player 199 has to catch this fruit to score points. If the trajectory mapping unit identifies the catch event, it will transmit this to the game controller, which may add a fixed amount of points to player 199's account, or a variable amount depending on further transmitted information of the catch event, such as whether the ball was barely touched with the fingertips or really firmly caught (of course, apart from determining this with the sensors in the ball-shaped moveable display, player behavior information—such as how far he had to jump—may also be transmitted, e.g. on the basis of camera analysis). To make the game more interesting, at certain times, e.g. determined purely on the basis of the clock 206 time, the picture will become a bad picture (e.g. an angry face, or a bomb) in which case player 199 should stay clear of the display to avoid malus points. To make things even more interesting, this change of status may occur only if a player is near (e.g. based on a camera analysis of the closeness of player and display, or on how clumsy a user is reaching for the display etc.). A good construction—although the skilled person will realize that alternatives for the components are possible—is the following.

The outer shell of the display is preferably made of an elastic, largely translucent polymer material, such as e.g. a silicone rubber (chemical companies provide the most appropriate one dependent on processability, desired elasticity, and translucency for the desired thickness). Of course other plastics or other materials can be used, e.g. for non-elastic balls. Two halves of the ball are molded, with the desired spared-out pits in place, e.g. for a connection to a chargeable battery 213. The display and computing related components are typically connected together before mounting in the ball half. Picture display unit is e.g. a bendeable display, such as LCD displays, polymer LED display, foil display, electronic ink display, multiLED on flexible display (of course non-bended displays can also be used—as long as their light need not pass through too much translucent material, but although for very robust displays one may fill them solid, typically there will de some air between the mounted picture display unit and the flexible shell—, and a configuration of LEDs may be used mounted on a curved support, etc.), which is attached following the curvature of the ball half shell (which is e.g. 1 to 2 cm thick), e.g. by gluing (the drive electronics etc. are not explicitly shown). Additional fixing with e.g. screws may also be used for increased robustness. Having the internal components in place, the second half shell of the ball is connected e.g. by gluing or thermal fixing, etc. Lastly, typically so (partially) exterior components can be attached if desired (e.g. slided into prefixed holders before fixing the tow half balls, and then fixation).

An accelerometer 207 is comprised in the exemplary embodiment, different versions existing per se, so that e.g. acceleration in three dimensions can be recorded (e.g. with a piezo-type accelerometer). It is connected and supplies this information to the trajectory mapping unit 105.

A processing unit 223 typically may have such functionality as a communication unit to receive and transmit data from and to an antenna 221, typically with radio frequencies (e.g. around 500 kHz or some MHz, or even GHz). This is an example of a coupling to the game controller 103 in the PC. Two-way communication allows the game and display to be constantly in touch (typically display-player interaction is communicated to the game, which can then update its scenario, and send newly adapted pictures, but of course more complex interaction is achievable, e.g. with different subparts of the game scenario in the PC and display needing more accurate synchronization, in particular if there are several displays, which act e.g. as different soldiers in a war game; in this case the displays may communicate actions towards each other, such as e.g. proximity changing the displayed soldiers into fighting soldiers).

A simple user interaction technology is comprised in the display 201, namely a number of charged capacitors distributed around the sphere (example of a vicinity monitoring unit 211 for measuring the disturbance of a surrounding electromagnetic field, in this case an electric field 299), which are connected to sensors sensing the disturbance in the field when the ball display comes near an object such as a player. The fields can be more intelligently tuned, so that more information can be measured, such as related to the distance of the nearing object (also the rate of change of the fields can be analyzed). Such electrodes can also be used as an exemplary pick-up or contact sensor: no current flows, except when a relatively good conducting sweaty player touches two oppositely charged electrodes. Configurations may be dynamically switched for increased sensing capability.

The display may also be attached via a pit-embedded ring with a co-supplied elastic cord, so that the players can swing the display towards each other, and these accelerations are modeled by the accelerometer.

Figure 3:
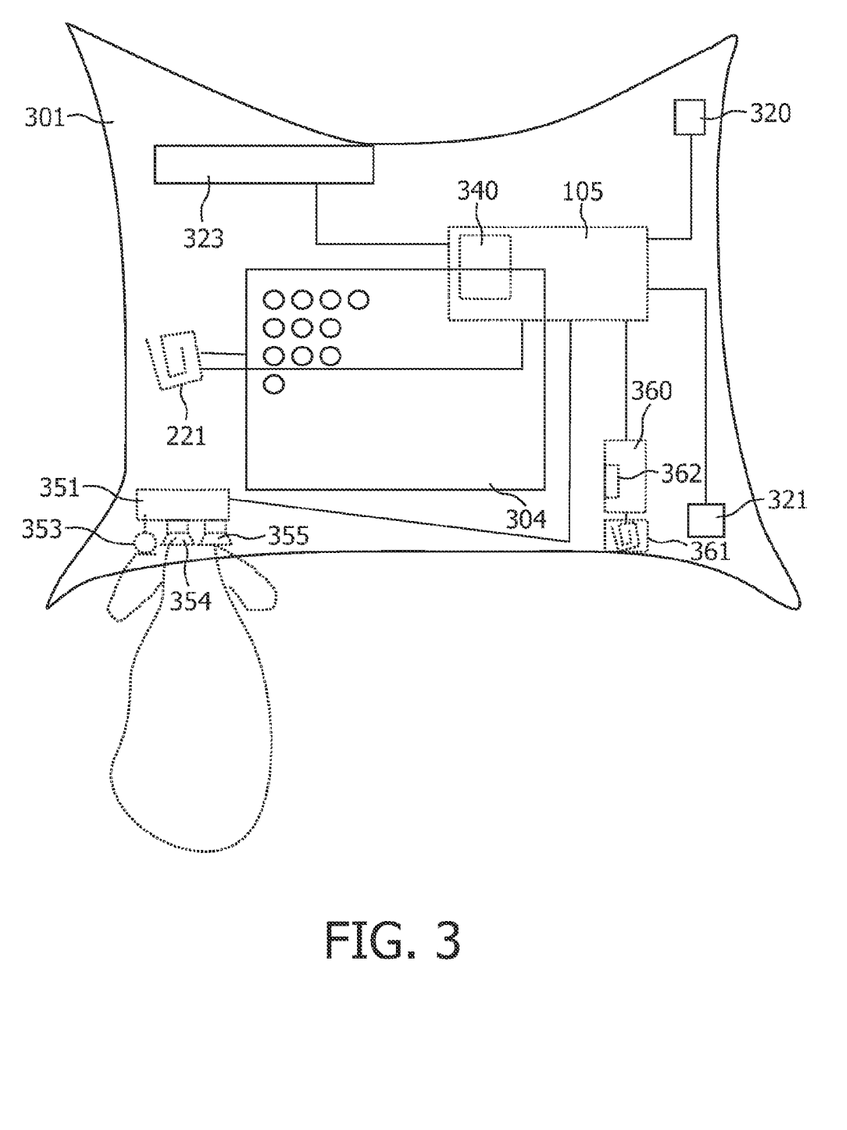
FIG. 3 schematically illustrates a cushion-shaped robust moveable display specifically designed for playing the same particular interactive game or other games with the gaming system.

FIG. 3 shows another example of a possible pillow-shaped robust moveable display 301 useful for our present gaming system and methods.

It is an augmented (with sensor and gaming system electronics) version of the pillow displays which Philips introduced e.g. at CEBIT 2005 fair.

It contains basically a two-dimensional array of LEDs 304 inside a pillow, which transmits enough of the light in its original form, so that the picture is visible from the outside.

It illustrates a number of possible more advanced sensors for monitoring the display trajectory and/or interacting with the players (note that the components are described functionally, and the skilled person will understand when he can re-use components such as an antenna; e.g. if ultrasound positioning is used, this system can also be used to communicate with the tags of the players, the game controller etc., and then no RF communication system is required, saving costs).

A typical game which can be played with this embodiment is the following: player 198 throws the pillow in the air, and the flying dragon is displayed. Player 199 has to kill it by shooting it, which event is detected and recognized by the trajectory mapping unit, which coordinates from then on the showing of a dead falling down dragon.

E.g., an infrared or other optical gun can be used, which beam is sensed by one or several strategically placed—typically IR—photosensors 320, 321 (e.g. so that good capturing is guaranteed for lesser shooters). Additionally or alternatively another sensor, namely a humidity sensor 323 may be present, which detects the water sprayed from a water gun. It may be embodied e.g. as a water-absorbing layer in between electrodes which sense the resistance change. The ultrasound system can also be used for use with co-supplied ultrasound guns. In this case beam former techniques with several microphones can be used to make the system more or less precise to accurate shooting.

Two examples of possible display position estimation means are shown, which can also double as player position determination means, in particular also the proximity of players (which is relative and less precise than the absolute player position); examples of camera-based derivation were described above already.

A radio frequency communication unit 360 can communicate with fixed beacons (e.g. placed in the corners of the room) and arm-straps (or other attached tags, e.g. in-pocket) on players, via antenna 361. The display can triangulate its position e.g. via time-of-flight calculations, which signal analysis and creation unit 362 is arranged to perform. It can also calculate the time-of-flight to the transceiver of the player strap, or receive its triangulation information relative to the beacons. Typically before time-of-flight signal transmission clock synchronization will be done. Typically an ID of the player will also be communicated, and perhaps also further information. This is interesting when the user does not communicate via a simple tag, but a small computing device (e.g. on the mobile phone or a dedicated gaming console), on which under the control of supplied user-interface software the user may input further scenario-relevant character behavior data, e.g. that currently he feels angry.

Another example of a system by which display position can be measured, communicated, etc., is the ultrasound system comprising an ultrasound signal generation and analysis unit 351, and one or several microphones 353, and one or several loudspeakers 354, 355 (so that a beam forming pattern can be formed by the ultrasound signal generation and analysis unit 351). This system may also use time-of-flight analysis, or the template based positioning of WO 2004/095056.

Already described above are examples of sensors and information processing regarding positions and movements of gaming objects: spatial position estimation means for the display (e.g. based on ultrasound triangulation with at least four out of plane beacons), player position determination means (e.g. by camera 105), and a special kind of relative player position determining means, namely proximity detection means (e.g. the electric field disturbance analysis unit 211, or sensors that detect actual handling of the display, e.g. the accelerometer detecting non-parabolic accelerations, or e.g. signal time-of-flight measurement between the display and a transceiver carried by the user, e.g. on the tip of a stick he uses to touch the display).

It is further interesting to have a system which has at least a crude awareness of actions and/or behavior (which could comprise also state of mind indications) of a player, an exemplary embodiment of a player behavior determination unit being incorporated in the trajectory mapping unit 105 in FIG. 3 (in general there may of course be several such player behavior determination unit in different devices—e.g. the PC—coupled in a communication network). This player behavior determination unit gets the input e.g. from the humidity sensor, and knows then that a player has accurately shot at the display. With the light sensors, detection of a particularly temporally modulated illumination pattern or particular frequency, etc., can further convey which of the users actually shot.

Other player actions may e.g. be temporarily enclosing the display in a box—detectable by the photosensors—in a hide and seek game, or a player jumping up or perform so motion towards the display with one of his extremities or a carried object, or throw something towards the display, e.g. detectable by the camera (more advanced displays may have their own camera(s) on board—not shown—e.g. cheap CMOS cameras sensing around on all sides).

The algorithmic components disclosed in this text may in practice be (entirely or in part) realized as hardware (e.g. parts of an application specific IC) or as software running on a special digital signal processor, or a generic processor, etc.

It should be understandable to the skilled person from our presentation which components can be optional improvements and be realized in combination with other components, and how (optional) steps of methods correspond to respective means of apparatuses, and vice versa. Apparatus in this application is used in the broadest sense presented in the dictionary, namely a group of means allowing the realization of a particular objective, and can hence e.g. be (a small part of) an IC, or a dedicated appliance, or part of a networked system, etc.

The computer program product denotation should be understood as encompassing any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not in-depth mentioned all these options. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An electronic gaming system comprising:
   a robust, moveable display having a picture display unit, the robust, moveable display being subject to gaming actions that include (i) movement of the robust moveable display in space and time along a path of a real trajectory in real space and (ii) impacts of collisions of the robust moveable display, wherein the movement along the path of the real trajectory includes throwing the robust moveable display along a parabolic path for an interval of free motion through real space, the robust moveable display further being configurable as a gaming character for participating in a game in which the picture display unit displays a behavior of the gaming character for at least two positions on the parabolic path for the interval of free motion through real space;
   a game controller, arranged to generate a game scenario, wherein the game scenario includes pictures of different behaviors of the gaming character that happen for each time moment of the game scenario to be displayed on the picture display unit of the robust moveable display; and
   a trajectory mapping unit, arranged to map (i) a virtual trajectory in space-time, corresponding to (a) space and (b) time of a virtual world in the game scenario, the virtual trajectory with at least two pictures of the gaming character's behavior in the game scenario having unequal picture content corresponding to different locations along the virtual space-time trajectory in the game scenario, to (ii) the real trajectory of the robust moveable display along the parabolic path for the interval of free motion through real space, so that each picture of the at least two pictures of the gaming character's behavior in the game scenario along the virtual trajectory is displayed on the picture display unit of the robust moveable display at an appropriate moment in (a) space and (b) time along the parabolic path of the real trajectory for the interval of free motion through real space.

2. The electronic gaming system as claimed in claim 1, wherein the game controller is arranged to generate a game scenario of a game in which a game character acts according to behavior rules of the game, in dependence on its position in (a) space and (b) time along the virtual trajectory, and wherein the trajectory mapping unit is arranged to store data of the robust moveable display in dependence on its position in (a) space and (b) time along the real trajectory, thereby allowing the robust, moveable display which functions as a game character to simulate a real character participating in the game.

3. The electronic gaming system as claimed in claim 1, wherein the trajectory mapping unit is coupled to a spatial position estimation component wherein the spatial position estimation component supplies information to the trajectory mapping unit for the trajectory mapping unit to at least analyze a vertical motion of the robust moveable display through real space.

4. The electronic gaming system as claimed in claim 3, wherein the spatial position estimation component comprises an accelerometer.

5. The electronic gaming system as claimed in claim 3, wherein the spatial position estimation component comprises an ultrasound emitter and detector.

6. The electronic gaming system as claimed in claim 3, wherein the spatial position estimation component is further arranged to receive as input a picture from at least one camera to analyze the vertical motion of the robust moveable display through real space.

7. The electronic gaming system as claimed in claim 1, wherein the trajectory mapping unit is coupled to a player position determination component, wherein the player position determination component supplies information to the trajectory mapping unit for the trajectory mapping unit to at least determine position of a player of the electronic system in real space.

8. The electronic gaming system as claimed in claim 7, wherein the player position determination component is further arranged to receive as input a picture from at least one camera to determine the position of the player of the electronic gaming system in real space.

9. The electronic gaming system as claimed in claim 7, further comprising a proximity detection component, wherein the proximity detection component provides information for use to determine a proximity of the player from the robust moveable display.

10. The electronic gaming system as claimed in claim 9, wherein the proximity detection component further prvides information for use to evaluate a signal time-of-flight to determine the proximity of the player from the robust moveable display.

11. The electronic gaming system as claimed in claim 9, wherein the proximity detection component includes a vicinity monitoring unit arranged to measure a disturbance of a surrounding electromagnetic field for use to determine the proximity of the player from the robust moveable display.

12. The electronic gaming system as claimed in claim 1, further comprising a player action detection component, wherein the player action detection component provides information for use to detect at least one particular action of at least one of a number of possible players.

13. The electronic gaming system as claimed in claim 12, wherein the player action detection component is coupled to at least one light sensor attached to the robust moveable display to supply information for use to detect the at least one particular action of the at least one of a number of possible players.

14. The electronic gaming system as claimed in claim 12, wherein the player action detection component is further arranged to receive as input a picture from at least one camera to detect the at least one particular action of the at least one of a number of possible players.

15. A robust moveable display usable for electronic gaming and subject to gaming actions that include (i) movement of the robust moveable display in space and time along a path of a real trajectory in real space and (ii) impacts of collisions of the robust moveable display, wherein the movement along the path of the real trajectory includes throwing the robust moveable display along a parabolic path for an interval of free motion through real space, the robust moveable display comprising:
   a picture display unit, wherein the robust moveable display is configurable as a gaming character for participating in a game in which the picture display unit displays a behavior of the gaming character for at least two positions on the parabolic path for the interval of free motion through real space;
   a processing unit configured to couple to a game controller, arranged to generate a game scenario, wherein the game scenario includes pictures of different behaviors of the gaming character that happen for each time moment of the game scenario to be displayed on the picture display element of the robust moveable display; and a trajectory mapping unit, arranged to map (i) a virtual trajectory in space-time, corresponding to (a) space and (b) time of a virtual world in the game scenario, the virtual trajectory with at least two pictures of the gaming character's behavior in the game scenario having unequal picture content corresponding to different locations along the virtual space-time trajectory in the game scenario, to (ii) the real trajectory of the robust moveable display along the parabolic path for the interval of free motion through real space, so that each picture of the at least two pictures of the gaming character's behavior in the game scenario along the virtual trajectory is displayed on the picture display unit of the robust moveable display at an appropriate moment in (a) space and (b) time along the parabolic path of the real trajectory along the parabolic path for the interval of free motion through real space.

16. The robust moveable display as claimed in claim 15, wherein it is formed as a soft pillow or an elastic ball.

17. A method of gaming with an electronic gaming system including a robust moveable display, a game controller, and a trajectory mapping unit, the method comprising moving, via gaming actions of the electronic gaming system that include (i) movement of the robust moveable display in space and time along a path of a real trajectory in real space and (ii) impacts of collisions of the robust moveable display through space along a path of a real trajectory, the robust moveable display having a picture display unit, wherein the movement along the path of the real trajectory includes throwing the moveable display along a parabolic path for an interval of free motion through real space, the robust moveable display further being configurable as a gaming character for participating in a game in which the picture display unit displays a behavior of the gaming character for at least two positions on the parabolic path for the interval of free motion through real space;

generating a game scenario, via the game controller, wherein the game scenario includes pictures of different behaviors of the gaming character that happen for each time moment of the game scenario to be displayed on the picture display unit of the robust moveable display; and coordinating, via the trajectory mapping unit, when the pictures of the game scenario are to be displayed on the picture display unit of the robust moveable display, the trajectory mapping unit being arranged to map (i) a virtual trajectory in space-time, corresponding to (a) space and (b) time of a virtual world in the game scenario, the virtual trajectory with at least two pictures of the gaming character's behavior in the game scenario having unequal picture content corresponding to different locations along the virtual space-time trajectory in the game scenario, to (ii) the real trajectory of the robust moveable display along the parabolic path for the interval of free motion through real space, so that each picture of the at least two pictures of the game scenario along the virtual trajectory is displayed on the picture display unit of the robust moveable display at an appropriate moment in (a) space and (b) time along the parabolic path of the real trajectory for the interval of free motion through real space.

18. A non-transitory computer-readable medium encoded with a computer program comprising code for enabling a processor to perform a method of gaming with an electronic gaming system that includes a robust moveable display, a game controller, and a trajectory mapping unit, the method comprising:

moving, via gaming actions of the electronic gaming system that include (i) movement of the robust moveable display in space and time along a path of a real trajectory in real space and (ii) impacts of collisions of the robust moveable display through space along a path of a real trajectory, the robust moveable display having a picture display unit, wherein the movement along the path of the real trajectory includes throwing the moveable display along a parabolic path for an interval of free motion through real space, the robust moveable display further being configurable as a gaming character for participating in a game in which the picture display unit displays a behavior of the gaming character for at least two positions on the parabolic path for the interval of free motion through real space;

generating a game scenario, via the game controller, wherein the game scenario includes pictures of different behaviors of the gaming character that happen for each time moment of the game scenario to be displayed on the picture display unit of the robust moveable display; and coordinating, via the trajectory mapping unit, when the pictures of the game scenario are to be displayed on the picture display unit of the robust moveable display, the trajectory mapping unit being arranged to map (i) a virtual trajectory in space-time, corresponding to (a) space and (b) time of a virtual world in the game scenario, the virtual trajectory with at least two pictures of the gaming character's behavior in the game scenario having unequal picture content corresponding to different locations along the virtual space-time trajectory in the game scenario, to (ii) the real trajectory of the robust moveable display along the parabolic path for the interval of free motion through real space, so that each picture of the at least two pictures of the game scenario along the virtual trajectory is displayed on the picture display unit of the robust moveable display at an appropriate moment in (a) space and (b) time along the parabolic path of the real trajectory for the interval of free motion through real space.

\* \* \* \* \*